(12) United States Patent
McCall

(10) Patent No.: US 12,280,739 B2
(45) Date of Patent: Apr. 22, 2025

(54) VEHICLE LOGO BASED CONTROLLER

(71) Applicant: Rivian IP Holdings, LLC, Plymouth, MI (US)

(72) Inventor: David Wright McCall, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 13 days.

(21) Appl. No.: 18/193,143

(22) Filed: Mar. 30, 2023

(65) Prior Publication Data

US 2024/0217480 A1 Jul. 4, 2024

Related U.S. Application Data

(60) Provisional application No. 63/477,907, filed on Dec. 30, 2022.

(51) Int. Cl.
| | |
|---|---|
| *B60R 25/20* | (2013.01) |
| *B60K 35/00* | (2006.01) |
| *B60R 25/31* | (2013.01) |
| *B60K 35/60* | (2024.01) |

(52) U.S. Cl.
CPC ............. *B60R 25/20* (2013.01); *B60K 35/00* (2013.01); *B60R 25/31* (2013.01); *B60K 35/60* (2024.01); *B60K 2360/794* (2024.01); *B60K 2360/797* (2024.01)

(58) Field of Classification Search
CPC ......... B60R 25/20; B60R 25/31; B60K 35/00; B60K 2360/797; B60K 35/60; B60K 2360/794
USPC ........................................................ 340/5.72
See application file for complete search history.

(56) References Cited

U.S. PATENT DOCUMENTS

| | | | | |
|---|---|---|---|---|
| 8,326,501 | B2 * | 12/2012 | Hustyi | F16H 59/12 |
| | | | | 701/53 |
| 11,820,329 | B2 * | 11/2023 | Buss | B60R 25/209 |
| 2010/0222972 | A1 * | 9/2010 | Hustyi | F16H 59/02 |
| | | | | 345/173 |
| 2019/0333304 | A1 * | 10/2019 | Flynn | G06Q 20/327 |
| 2020/0193001 | A1 * | 6/2020 | Qin | G06F 3/0482 |
| 2022/0242366 | A1 * | 8/2022 | Nagata | B60R 25/23 |
| 2023/0037655 | A1 * | 2/2023 | Hurr | B60R 25/24 |

* cited by examiner

*Primary Examiner* — Zhen Y Wu
(74) *Attorney, Agent, or Firm* — Foley & Lardner LLP

(57) ABSTRACT

A vehicle logo-based controller is provided. The logo can include buttons. A system can include one or more processors communicatively coupled with memory and the logo. The system can detect one or more inputs from the buttons. The system can compare the one or more detected inputs with one or more stored inputs to determine a match. The system can determine, responsive to the comparison, a function of a vehicle, such as unlocking a compartment.

19 Claims, 6 Drawing Sheets

VEHICLE LOGO BASED CONTROLLER

CROSS-REFERENCE TO RELATED APPLICATIONS

This application claims the benefit of priority under 35 U.S.C. § 119 to U.S. Provisional Patent Application No. 63/477,907, filed Dec. 30, 2022, which is hereby incorporated by reference herein in its entirety.

INTRODUCTION

Vehicles can store cargo in a locked area.

SUMMARY

At least one aspect can be directed to a system. The system can include a logo. The logo can include a plurality of buttons. The system can include one or more processors communicatively coupled with memory and the logo. The one or more processors can detect one or more inputs from the plurality of buttons. The one or more processors can compare the one or more detected inputs with one or more stored inputs based at least on the plurality of buttons. The one or more processors can determine, responsive to the comparison, a function of a vehicle.

At least one aspect can be directed to a method. The method can be performed by one or more processors communicatively coupled with memory. The method can include the one or more processors detecting one or more inputs from a plurality of buttons of a logo. The method can include the one or more processors comparing the one or more detected inputs with one or more stored inputs based at least on the plurality of buttons. The method can include the one or more processors determining responsive to the comparison, a function of a vehicle.

At least one aspect can be directed to a vehicle. The vehicle can include a logo on an exterior surface of the vehicle. The logo can include a plurality of buttons. The vehicle can include one or more processors communicatively coupled with memory and the plurality of buttons of the logo. The one or more processors can receive an indication of a sequence of actuation of the plurality of buttons of the logo. The one or more processors can match the sequence of actuation of the plurality of buttons with a stored input stored in the memory of the vehicle. The one or more processors can execute, responsive to the match, a function of the vehicle linked with the stored input.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a vehicle logo-based controller. The various concepts introduced above and discussed in greater detail below may be implemented in any of numerous ways.

This technical solution is generally directed to a vehicle logo-based controller. For example, the technology can include systems, methods, and apparatus of a vehicle logo controller that can unlock a compartment of a vehicle responsive to a user input through a plurality of buttons of the logo. The logo can be located on an external surface of the vehicle and be configured with one or more buttons or other input interface. The logo can include 2, 3, 4 or more buttons that are arranged on the surface of the vehicle and configured to provide a user interface through which a user can input a sequence or pattern. The system can detect the inputs by the user, compare the user inputs to stored inputs, and make a determination of a match. Upon determination of a match, the system can perform a function of the vehicle. For example, this technical solution can unlock a compartment (e.g., an external compartment) of the vehicle through a user input. The disclosed solution can provide advanced control of the system through state identification to determine if the vehicle is in a condition to receive inputs.

By configuring a logo on the surface of the vehicle to receive user input sequences and control a function of the vehicle, this technical solution can reduce the number of components of the vehicle or external features of the vehicle. By reducing the number of components of the vehicle, this technical solution can reduce the number of materials used to manufacture the vehicle, as well as the weight of the vehicle, thereby improving the efficiency with which the vehicle is manufactured as well as the performance of the vehicle. Further, by reducing the number of components located on an external surface of the vehicle, this technical solution can reduce drag of the vehicle, thereby making the vehicle more aerodynamic and improving the efficiency of the vehicle by reducing energy or battery utilization. Thus, this technical solution can provide external access to functions of the vehicle without the use of a key, remote control, or other wireless communication without adding additional buttons or components to the external surface of the vehicle.

Figure 1:
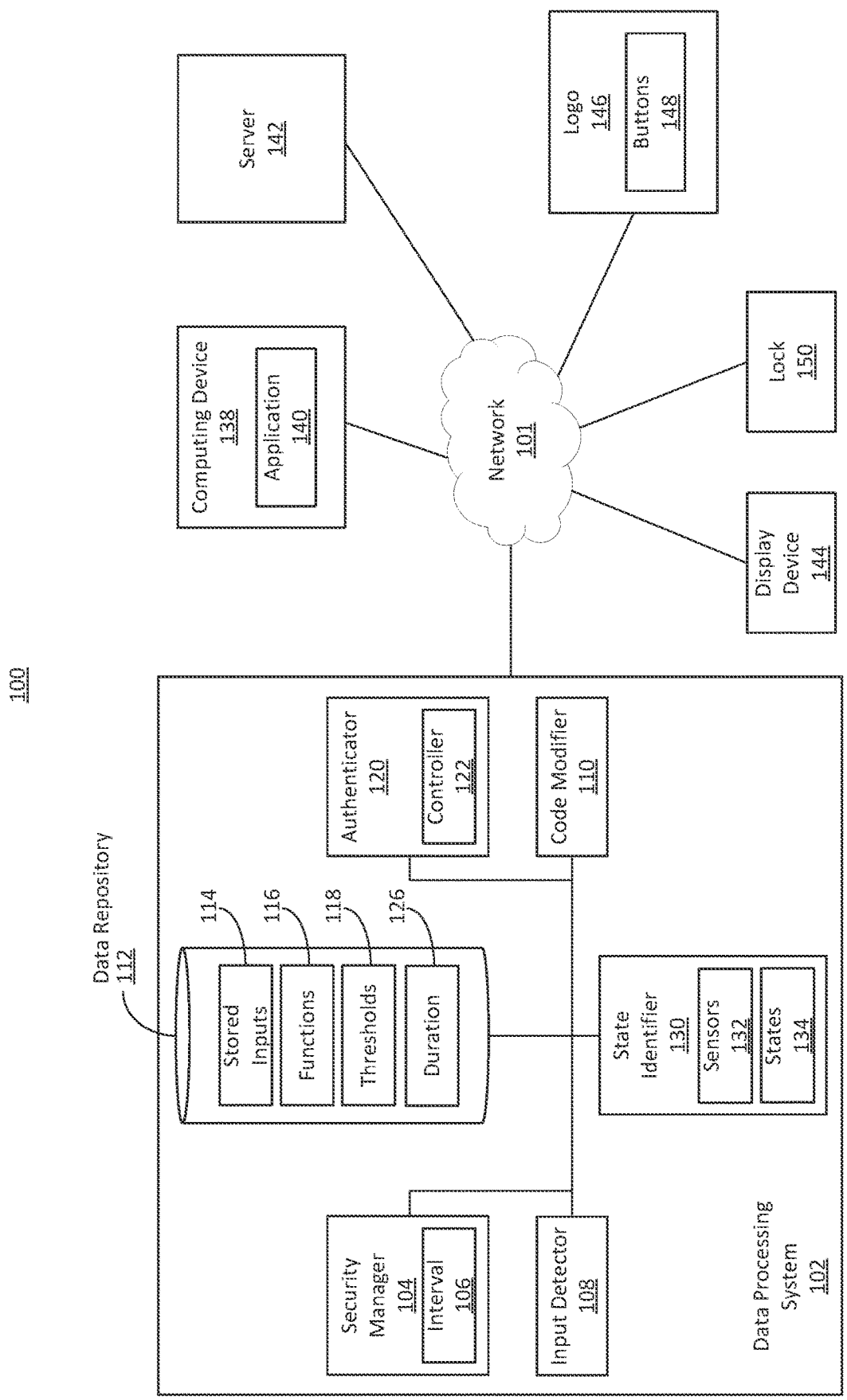
FIG. 1 depicts an example system of a vehicle logo-based controller.

FIG. 1 depicts an example system 100 for a vehicle logo-based controller. The system 100 can include a data processing system 102. The data processing system 102 can include at least one security manager 104, which can maintain or utilize one or more interval 106. The data processing system 102 can include at least one input detector 108. The data processing system 102 can include at least code modifier 110. The data processing system 102 can include at least one authenticator 120. The authenticator 120 can include at least one controller 122. The data processing system 102 can include at least one state identifier 130. The state identifier 130 can include or interface with a sensor 132, or maintain or manage one or more states 134. The data processing system 102 can include, interface with, or otherwise access or use at least one data repository 112. The data repository 112 can include one or more data structures, files, or information, such as stored inputs 114, functions 116, thresholds 118, or duration 126.

The security manager 104, input detector 108, authenticator 120, code modifier 110, or state identifier 130 can each include at least one processing unit or other logic device such as programmable logic array engine, or module configured to communicate with the data repository 112 or database. The security manager 104, input detector 108, authenticator 120, code modifier 110, or state identifier 130 can be separate components, a single component, or part of the data processing system 102. The system 100 and its components, such as a data processing system 102, can include hardware elements, such as one or more processors, logic devices, or circuits.

The data repository 112 can be any device to store and access information about the system 100. The data repository 112 can be, for example, a cloud device, a disk drive, or a hard drive. The data repository 112 can be accessed by any of the subcomponents of system 100. The data repository 112 can be accessed periodically, for example in response to user inputs, via scheduled software interrupts, or in response to a direction from any of the subcomponents of system 100. For example, authenticator 120 may access data repository 112 to access stored inputs 114 for comparison to user inputs. Data repository 112 can include, manage, maintain or otherwise store stored inputs 114, functions 116, thresholds 118, or duration 126.

The stored inputs 114 can include any stored inputs, sequences, orders, codes, arrangement, patterns or series that the system 100 can recognize and use as a basis of comparison. For example, stored inputs 114 can be a sequence of button press inputs that have been preprogrammed by the user and can be accessible within the data repository 112. Stored inputs 114 can include a plurality of patterns. Stored inputs 114 can be modified. For example, a user can add a stored input 114 to the plurality of stored inputs, via an application 140. Each pattern of the plurality of stored inputs 114 can be of any length, order, or duration. Stored inputs 114 can be stored as a data structure such as a list, chart, or look up table.

The functions 116 can be any action, actuation, task, automation, response, or update of the vehicle responsive to a comparison by the authenticator 120. Functions 116 can be a physical action of the vehicle or a software change of the vehicle. The functions 116 can be updated by the user or via a software update. For example, functions 116 can include locking or unlocking a lock, causing a car alarm to go off, updating a counter of the vehicle, activation of a light of the vehicle (e.g., turning on the light), or sending a message to a display. Functions 116 can be authorized by a controller 122. Functions 116 can include instructions for actuation. Functions 116 can be stored in data repository 112.

The thresholds 118 can include any limit, maximum or minimum that is not to be exceeded or fallen under. The thresholds 118 can be a time threshold, duration threshold, or attempts threshold. For example, thresholds 118 can include thresholds for a number of wrong (e.g., not matched or compared) input sequence attempts. For example, thresholds 118 can be a threshold for an upper amount of time within which an input must be entered by the user. For example, threshold 118 can be a duration threshold for an amount of time a user must enter a sequence once the user has begun entering the sequence. Thresholds 118 can be modified or updated by the user or by the system 100. Thresholds 118 can be accessed by security manager 104, authenticator 120, or by any other subcomponent of the system 100. The thresholds 118 can be dynamic or fixed.

The duration 126 can be any length of time of the user input. For example, duration can be the length of time between the second and third button presses, or between the third and fourth button presses, or duration can refer to the entire length of time of the entrance of a sequence. Duration 126 can be used by the authenticator 120 for comparison. For example, authenticator 120 can compare the duration of the user input to a threshold 118 of user input time. The input detector 108 can initiate incrementing the duration 126. For example, upon recognizing an initial button press of the plurality of buttons 148, input detector can begin to increment the duration (e.g., count the time of the duration).

The data processing system 102 can, via network 101, interface with, communicate with, receive or provide information with, or otherwise access or utilize one or more of a display device 144, lock 150, server 142, computing device 138, or logo 146. The network 101 can include any kind of communications link, cables, transmitters, receivers, transceiver, logic circuit, communication chip, communication network (e.g. a local area network ("LAN"), a wide area network ("WAN"), or an inter-network (the internet)), configured to enable communication, transmission, reception, or connection with the components of the system and with outside systems. Network 101 can enable communication with the data processing system 102, the computing device 138, a server 142, the lock 150, or the logo 146 and its buttons 148.

The logo 146 can be any symbol, insignia, or icon. The logo 146 can indicate information, such as a source of goods. The logo 146 can indicate the manufacturer of a vehicle, or the make or model of the vehicle. The logo 146 can include an identifier of the entity that manufacturers the vehicle, or the make or model of the vehicle. Logo 146 can be or include, for example, an image representing a company.

Figure 4:
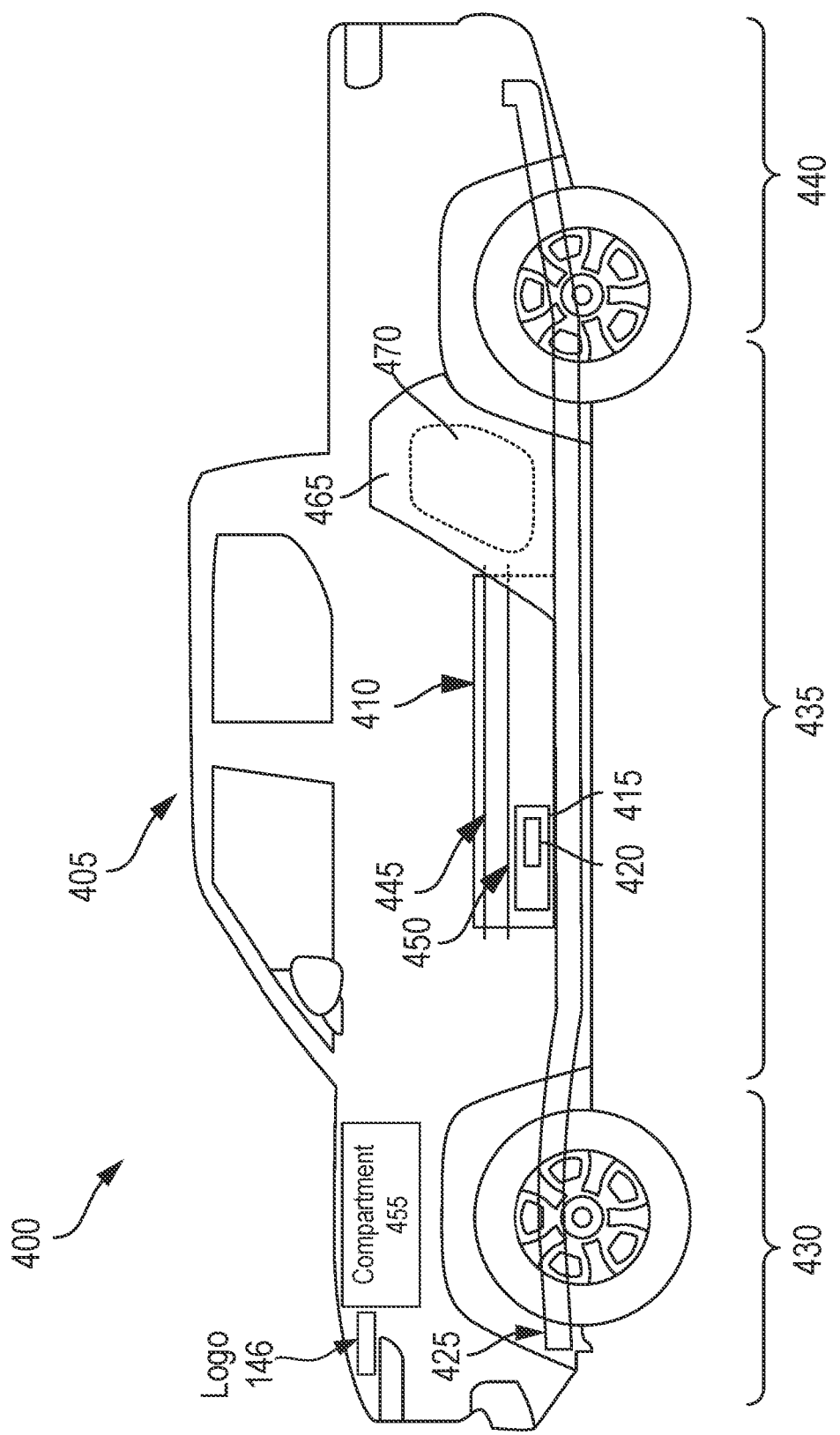
FIG. 4 depicts a cross sectional view of an electric vehicle.

The logo 146 can be located on an external surface of the vehicle, such as vehicle 405 depicted in FIG. 4. For example, the logo 146 can be located on a front portion of the vehicle, rear portion of the vehicle, side portion of the vehicle, or any other location on the vehicle. The logo 146 can be located on an external surface of the vehicle 405 that can be accessed external from the vehicle. For example, the logo 146 can be located on the front hood of the vehicle, the trunk of the vehicle, or a door of the vehicle. Logo 146 can be made of a plurality of materials, such as glass, metal, plastic, chrome, aluminum, silicone, or wood.

The logo 146 can include one or more buttons 148. For example, the logo 146 can include or be formed of two buttons, three buttons, four buttons, or more buttons. The buttons 148 can be arranged in a shape to form the logo 146. The buttons 148 can, for example, be in the shape of the logo 146 or be included within the logo 146. The buttons 148 can be in any configuration.

The buttons 148 be designed, constructed and operational to accept a user input of a sequence of actuation. The buttons 148 can be any type of interface for accepting user input, such as a capacitive touch button, a toggle, or a push button. Actuation or deployment of the buttons 148 can send a sequence of actuation to the data processing system 102. The buttons 148 can be activated or deactivated by the data processing system 102. For example, the data processing system 102 can deactivate the buttons 148 such that the buttons 148 or prevented from being actuated or sending a signal to the data processing system 102, or the data processing system 102 can determine to not process any signals received from the buttons 148 during deactivation.

The system 100 can include, interface, access, or otherwise utilize a lock 150. The lock 150 can be any mechanism for locking a compartment of the vehicle. The lock 150 can be or include at least one of a mechanical lock, cam lock, latch, switch, lever, slide, clasp, bolt, bar, or clip. The lock 150 can be mounted, attached, placed, secured or coupled with a compartment. The lock 150 can hold, secure, maintain or otherwise lock the compartment in the closed position. For example, the locking mechanism 150 can lock the compartment similar to a lock on a vehicle door. The lock 150 can have at least one closed position (e.g., a first position) and at least one open position (e.g., a second position). The first position can lock the compartment in the closed position. The second position allows for the compartment to move from the closed position to the open position. The lock 150 can be electrically actuated, such as by the controller 122. The lock can be moved from the first position to the second position by an instruction sent from the controller 122, responsive to a determination by the authenticator of a match between the user inputs and the stored input 114. Moving from the first position to the second position can be disabled by the controller 122 in response to either the state identifier 130 or the security manager 104 making such a determination.

The data processing system 102 can interface with, or otherwise communicate with a display device 144. The display device 144 can be any screen, display, or notification system for alerting the user to the execution of a function 116. The display device 144 can be an LCD screen, a touchscreen, an LED screen, or any other such screen. The display device 144 can be located in the cabin of the vehicle (e.g., on the dashboard) or on the exterior of the vehicle (e.g., in a truck bed). The display device 144 can display a notification to the user responsive to the authenticator 120 determining a match between the user input sequence of actuation and the stored input 114.

The server 142 can be any type of device to facilitate the plurality of functionalities of the system 100. The server 142 can be one or many of, for example, a database, an application manager, communications, or a computer. In some cases, the server 142 can act as an intermediary to the computing device 138 and the data processing system 102. For example, the data processing system 102 can execute on one or more processors located within the vehicle (e.g., vehicle 405 depicted in FIG. 4). The server 142 can communicate with the data processing system 102 via network 101. The server 142 can communicate with the computing device 138 via network. The server 142 can receive data or instructions from the computing device 138, and forward the data or instructions to the data processing system 102. In some cases, the server 142 can process the instructions or data received from the computing device 138, and then generate data or new instructions based on the processing to forward to the data processing system 102. The server 142 can receive data or information from the data processing system 102 of the vehicle, and forward, relay, or otherwise provide the data or information to the computing device 138. The computing device 138 can download the application 140 from the server 142.

The system 100 can include, interface with, or otherwise communicate or utilize a computing device 138. The computing device 138 can include on or more component or functionality depicted in FIG. 6. The computing device 138 can include, execute, host, or otherwise access or utilize an application 140. Computing device 138 can be any device that is separate from the vehicle 405 (e.g., not integrated or part of the vehicle 405) that can communicate with the vehicle (via a network 101). The computing device 138, via application 140, can interact with the data processing system 102 to, for example, make a modification to the stored input 114. The computing device 138 can include, for example, a smart phone or a home computer. For example, the computing device 138 can be used to alter stored inputs 114 associated with unlocking a compartment of the vehicle remotely. The computing device 138 can communicate with the components of the system 100 wirelessly, such as via Wifi, Bluetooth, or cellular signals (e.g., 4G or 5G).

The application 140 can be any system, graphical user interface (GUI), program, or interactive device intended to facilitate updates by the user to the system 100. The application 140 can be web based or an executable program on the computing device 138. The application 140 can be used to update, change, modify, or otherwise alter components of the system 100 through communication with code modifier 110. For example, a user may utilize application 140 on remote computing device 138 to make an update to the plurality of stored inputs 114 and their corresponding functions 116.

In an illustrative example, the data processing system 102 can receive user inputs from a logo 146 located on an external surface of a vehicle 405. The data processing system 102 can, responsive to the user input, facilitate execution or performance of a function of the vehicle. For example, the data processing system 102 can determine if the vehicle is in a state to accept inputs. The data processing system 102 can then process inputs from a plurality of buttons contained in the logo 146 by the user, and can recognize the input being received, and subsequently attempt to match the user input to a stored input. Responsive to a successful match, the data processing system 102 can authorize, execute or otherwise facilitate performance of a function of the vehicle.

The data processing system 102 can include or otherwise access an input detector 108 designed, constructed and operational to detect one or more inputs from the buttons 148 of the logo 146. The input detector 108 can include any hardware or software that can notice, detect, receive, measure, or sense a user interacting with the buttons 148 of the logo 146. Interacting with the buttons 148 can include actuating the buttons 148, pressing the buttons 148, or otherwise activating the buttons 148.

The input detector 108 can receive one or more signals or communications corresponding to the input. The input detector 108 can receive wired or wireless signals, communications or data corresponding to the input. For example, the input detector 108 can be electrically connected via one or more wires to the buttons 148, and detect an activation of a button 148 based on a voltage level (e.g., 5 volts can indicate an activation, and 0 volts can indicate lack of activation). In another example, the buttons 148 can include a microcontroller or other logic device or processor that captures the actuation or sequence of actuation of the buttons 148, and packages the information about the sequence of actuation into one or more data packets, and transmits the data packets to the input detector 108.

Thus, the input detector 108 can receive an indication or identifier of which button 148 of the multiple buttons 148 was pressed or activated. The input detector 108 can receive a time stamp of the activation of the button 148, or the input detector 108 can record the time stamp responsive to receipt of the indication of the activation of the button 148. The input detector 108 can assign or store a time stamp with the identifier of the button 148 that was activated.

The input detector 108 can determine that the one or more inputs correspond to a sequence of actuation of the buttons 148. For example, each button 148 of the multiple buttons 148 can be activated one or more times in particular order or sequence. The order or sequence of activation can correspond to a pattern that can be stored in data repository 112 (e.g., as stored inputs 114). The sequence of actuation can correspond to a code, passcode, key code, password, or other authentication credential.

For example, the input detector 108 can include recognition a first button press of the plurality of buttons 148 of a logo 146. Input detector 108 can recognize a sequence of actuation of the buttons 148, responsive to a user input. A sequence of actuation can be any user inputs from the buttons 148. User inputs can include a pattern, series, code, order, or listing from a plurality of buttons. The sequence of actuation can indicate order, input duration, length, or number of inputs. The sequence of actuation can be limited by the thresholds 118. For example, the sequence of actuation can be limited to ten distinct button presses over a span of five minutes. For example, the sequence of actuation can be limited in pattern to include no repetition. The sequence of actuation may be entered more than once. Input detector 108 can recognize a time interval of the user input. Input detector 108 can cause an initiation of the authenticator 120 responsive to the detection of a user input. For example, input detector 108 can detect a first button press of the plurality of buttons 148 and notify the authenticator 120 to begin comparison.

The data processing system 102 can include an authenticator 120 designed, constructed and operational to compare the one or more detected inputs with one or more stored inputs 114. The authenticator 120 can be any combination of hardware and software for comparing user inputs to stored inputs 114 and making a determination based at least on that comparison. The authenticator 120 can include a controller 122. The authenticator 120 can utilize software, comparators, logic circuits, analog circuits, or other means for comparing two or more sets of information or inputs. For example, the authenticator 120 can compare an input by the user to a stored input 114. The authenticator 120 can determine if the data corresponding to the inputs are the same or different as a set of data or pattern corresponding to the stored inputs 114.

The authenticator 120 can initiate comparison based at least upon an input, such as responsive to receipt of input or an instruction from an input detector 108. The authenticator 120 can cease, terminate, or stop the comparison based at least on one of an exceedance of a threshold 118, a successful match, or via user command. A successful match can refer to or include determining that a sequence of actuation (e.g., user inputs) is equal to or the same as a stored input 114 within a specified interval 106.

To determine a match, the authenticator 120 can receive the sequence of actuation detected by the input detector 108. The authenticator 120 can determine which buttons 148 were actuated and in what order. In some cases, the same button 148 may be actuated more than once. The authenticator 120 can perform a lookup or query the stored inputs 114 in the data repository 112 to determine a match. The authenticator 120 can use one or more techniques to determine the match. For example, the authenticator 120 can determine a hash value for the detected input using a hash function. The authenticator 120 can compare the hash value for the detected inputs with hash values stored in the data repository 112. For example, the stored inputs 114 can be stored as hash values that were generated using the same hash function. If the authenticator 120 determines that a hash value based on the detected inputs matches a hash value of the stored inputs 114, then the authenticator 120 can determine a match.

The authenticator 120 can determine, responsive to the comparison, a function of the vehicle. If the authenticator 120 determines that the detected input matches a stored input 114, the authenticator 120 can determine what function 116 is associated, assigned, or otherwise linked with the matching stored input 114. For example, the data repository 112 can include a mapping of stored inputs 114 to functions 116. The authenticator 120 can perform a lookup in the mapping or functions 116 data structure using the matching stored input 114 to determine the corresponding or linked function 116. In some cases, each stored input 114 can map to a unique function 116 in a one-to-one mapping. In some cases, more than one stored input 114 can map to the same function 116. In some cases, more than one function 116 can map to same stored input 114 such that a matching detected input can cause the data processing system 102 to activate more than one function 116 or a series of function 116 (e.g., open both the front compartment of the vehicle, the back compartment of the vehicle, and a gear tunnel 470 of the vehicle).

The authenticator 120 can determine, based on the comparison, that the one or more inputs do not match any of the one or more stored inputs 114. If the authenticator 120 determines that the detected inputs (or sequence of actuation) do not match a stored input 114, then the authenticator 120 can determine not to perform a function 116, such as unlock a compartment of the vehicle. In some cases, if the authenticator 120 determines that the detected input does not match any of the stored inputs 114, the authenticator 120 can select a default function 116 or a null function 116. For example, the authenticator can select, responsive to the determination that the one or more detected inputs do not match any of the one or more stored inputs, silent function 116. A silent function can refer to a function that does not unlock any doors or compartments of the vehicle. A silent function 116 can include providing a visual indication that indicates that the detected inputs do not match any of the stored inputs 114. The silent function 116 can include provide an audio indication that indicates that the detected inputs do not match any of the stored inputs 114. The silent function 116 can include transmitting a notification or alert via network 101 to a computing device 138 or application 140 thereof that indicates that the detected inputs do not match any of the stored inputs 114. The transmitted notification can include a time stamp associated with the detected inputs, location of the vehicle at the time stamp, or the sequence of detected inputs that were determined not to match. A silent function can be, for example, a function that seems to perform no task for the user or a function that updates software.

The data processing system 102 can include a controller 122 designed, constructed and operational to provide a command, instruction or otherwise cause or facilitate the execution or performance of the one or more functions 116. The controller 122 can be any device that can send a signal to execute, authorize, or disable a function 116 of the vehicle 405 or buttons 148, responsive to a determination by the authenticator 120 or the state identifier 130. For example, the authenticator 120 can provide, to the controller 122, an indication to perform a function 116 of the vehicle to unlock a compartment door. The controller 122 can be mounted, attached, placed, secured or coupled with the data processing system 102 or a component thereof such as authenticator 120. The controller 122, responsive to receiving the indication to unlock a compartment door, can communicate with, interface with or otherwise interact with a lock 150. For example, the controller 122 can provide to a lock 150, a signal that causes the lock 150 to move from a closed position to an open position. The controller 122 can provide a signal to the security manager 104 responsive to not finding a match between a user input and a stored input 114. The controller 122 can provide a signal to a display device to indicate that the operation of a function 116 of the vehicle 405 was successful or unsuccessful. For example, the controller 122 can authorize a function of the vehicle 405, such as unlocking a compartment door and subsequent to the successful unlocking, provide a signal to a display device 144 to inform the user of a successful operation. The controller 122 can disable a function 116 of the vehicle or can disable the buttons 148 of the vehicle. For example, responsive to an indication from the security manager 104, the state identifier 130, or the authenticator 120, the controller can disable the buttons 148 of the logo 146. For example, responsive to the input attempts exceeding a threshold 118, the controller can prevent the buttons 148 from receiving input.

The data processing system 102 can include a security manager 104 designed, constructed and operational to activate or deactivate logo-based vehicle control by activating or deactivating one or more components of the data processing system 102. For example, the security manager 104 can disable or deactivate the data processing system 102 from determining a match between detected inputs and stored inputs 114 for a time interval 106. The security manager 104 can use one or more techniques to disable, deactivate, or otherwise prevent the data processing system 102 from performing a function. For example, the security manger 104 can disable the buttons 148 such that the buttons 148 cannot be actuated or interacted with. By disabling the buttons 148, the security manager 104 can prevent, for the time interval 106, the user from interacting with the buttons 148 or prevent the interactions with the buttons 148 from sending signals to the input detector 108. In another example, the security manager 104 can disable or prevent the input detector 108 from detecting inputs for the time interval 106 (e.g., 10 seconds, 15 seconds, 20 seconds, 30 seconds, 60 seconds, 2 minutes, 3 minutes, 5 minutes, 10 minutes or other time interval). The input detector 108, when disabled, may not process, detect, or otherwise react to inputs from the buttons 148. In another example, the security manager 104 can disable or prevent the authenticator 120, for the time interval 106, from determining whether detected inputs match stored inputs 114. In another example, the security manager 104 can disable or prevent, for the time interval 106, the controller 122 from causing the function 116 to be performed even if the authenticator 120 determines there is a match between the detected inputs and the stored inputs 114. Thus, the security manager 104 can use one or more techniques to disable or prevent execution of the function 116 for the time interval.

The security manager 104 can determine to disable or prevent execution of a function 116 based on one or more criteria. If the security manager 104 determines that greater than a threshold 118 number of incorrect sequences were received in a row or within a time interval, then the security manager 104 can disable or prevent processing of detected inputs for a certain amount of time. The security manager 104 can disable authorization of a function 116 or of buttons 148, responsive to the number of user input attempts exceeding a threshold 118. For example, if a user enters the incorrect combination too many times (e.g., the user inputs an unmatchable sequence using the buttons 148 exceeding a threshold number of times 118) within a duration 126, the security manager 104 can disable (via controller 122) unlocking a compartment of the vehicle. For example, if the wrong code was input five times within 30 seconds, then the data processing system 102 can deactivate logo-based vehicle control for 2 minutes. The security manager can limit the number of attempts of a sequence of actuation (e.g., number of distinct user inputs) by a threshold 118. For example, the user may only enter the incorrect (e.g., not matching any of the stored inputs 114) four times.

The interval 106 can be a duration of time for which the security manager 104 disables functions 116 or the buttons 148. The interval 106 can be different spans of time. For example, the interval 106 can increment responsive to more failed attempts of the sequence of actuation (e.g., user inputs) subsequent to the initial series of failed attempts. In some cases, the interval 106 can extend until it is overridden from within the vehicle or via the computing device 138 or via application 140. For example, after reaching a threshold 118 number of failed attempts of the sequence of actuation (e.g., user inputs), the interval 106 can extend until the user deactivates the system from within the vehicle itself, or with a physical key.

The data processing system 102 can include a state identifier 130 designed, constructed and operational to identify or assign a state of the vehicle. The state identifier 130 can include, access, interface with, or otherwise receive data from sensors 132 used to determine or identify states 134. For example, the state identifier 130 can detect (via sensors 132) a state 134 of the vehicle and disable a function 116 (via the controller 122) of the vehicle responsive to the detected state. For example, the state identifier 130 can sense the presence of a driver in the vehicle and can instruct the security manager 104 to disable performing one or more functions 116 responsive to detected input from buttons 148.

The sensors 132 can include one or more sensors. Sensors 132 can include any combination of sensors for detecting, measuring, seeing, sensing, or identifying a facet of the vehicle. For example, sensors 132 can include motion sensors to detect the presence of a driver inside or outside of the vehicle. Motion sensors can include passive infrared (PIR) sensors, optical motion sensors, or radio wave motion sensors. Sensors 132 can be located anywhere within or outside of the vehicle. For example, sensors can be located within the cabin of the vehicle, on the hood of the vehicle, or on a trunk of the vehicle. Sensors 132 can be electrically coupled to any component of the data processing system 102, such as the controller 122, input detector 108, or the state identifier 130.

States 134 can refer to a mode of the vehicle, such as the presence of a driver, occupancy of a seat of the vehicle, the operating condition of the vehicle (e.g., driving, idling, parked), or the engagement of any of the functions 116 of the vehicle. State identifier 130 can use sensors 132 to detect a state 134 of the vehicle. For example, state identifier 130 can detect that the vehicle is operating via communication with an electronic control unit or other drive unit of the vehicle.

The data processing system 102 can include a code modifier 110 designed, constructed and operational to modify, update, add, or otherwise adjust or change one or more of the stored inputs 114 of the data repository 112. The code modifier 110 can receive remote input from application 140 running on computing device 138. Code modifier 110 can, for example, change the stored inputs within data repository 112. For example, code modifier 110 can alter a code (e.g., stored input 114) associated with a function 116. The code modifier 110 can receive an instruction or indication from the application 140 to assign a function 116 to a stored input 114, or change a function assignment. The code modifier 110 can update or change intervals 106, thresholds 118, or durations 126. For example, a user can remotely change the stored inputs 114 associated with a function 116 via an application 140 on a smartphone sending a signal to code modifier 110.

Thus, the data processing system 102 can interface with a logo 146 including a plurality of buttons (e.g. buttons 148). The data processing system 102 can include one or more processors communicatively coupled with data repository 112 and the logo 146. The data processing system 102 can detect (e.g., via the input detector 108) one or more user inputs from the plurality of buttons 148. For example, a user can input a combination using the buttons 148 of the logo 146. The data processing system 102 can compare (e.g., via the authenticator 120) the one or more detected inputs with one or more stored inputs (e.g., stored inputs 114) based at least on the plurality of buttons 148. The data processing system 102 can determine whether the detected input match a stored input. A match can refer to an equivalency, similarity, corresponding pair, or duplicate. The data processing system 102 can determine, responsive to the comparison, a function 116 of a vehicle. For example, the authenticator 120 can compare a combination input by a user to a stored combination (e.g., stored inputs 114) in the data repository 112 and make a determination of a match (e.g., an equivalency). For example, responsive to the determination of a match, the authenticator 120 can determine a function 116 for the controller 122.

Figure 2:
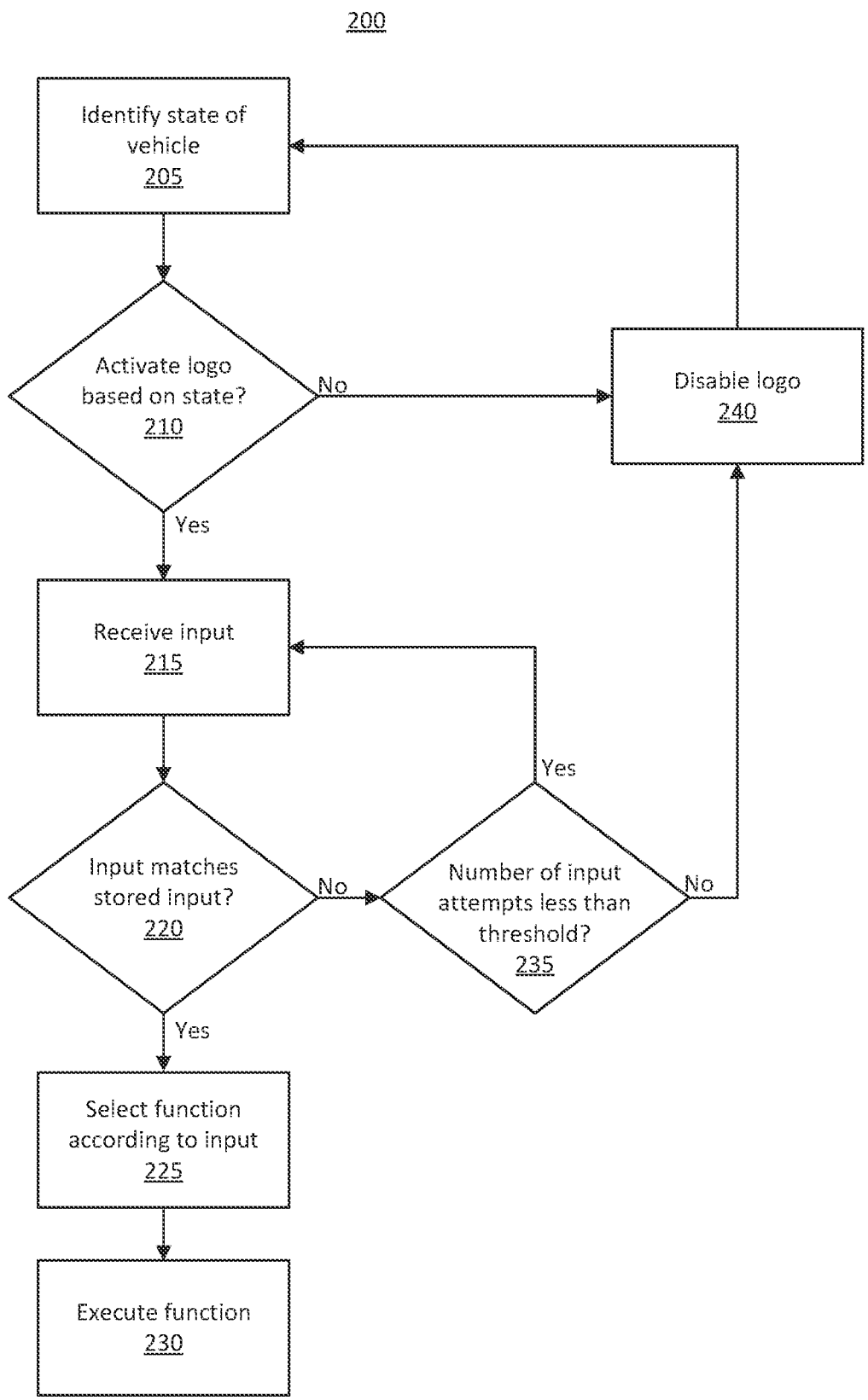
FIG. 2 depicts an example method for a vehicle logo-based controller.

FIG. 2 depicts an example method 200 for a vehicle logo-based controller. The method 200 can be performed by one or more system or component depicted in FIG. 1, FIG. 4, FIG. 5, or FIG. 6, including, for example, a data processing system and a logo. At ACT 205, the method 200 can include the data processing system identifying a state of a vehicle. The state of the vehicle can be state 134 and can correspond to variety of conditions of the vehicle. For example, the state 134 of the vehicle can correspond to a mode of operation of the vehicle, the presence of a driver in the driver seat of the vehicle, or a user input state. The state 134 of the vehicle can be determined by sensors (e.g., sensors 132), adjusters, one or more processors, or user input for example. The state can be identified by state identifier 130.

At decision block 210, the data processing system can determine whether to activate the logo based on the stated of the vehicle identified at ACT 2105. The logo can be logo 146. The logo can include a plurality of buttons 148 configured to receive inputs from a user. Certain states 134 can activate the logo and certain states 134 can disable the logo. For example, a state 134 corresponding to a driver in the driver seat can disable the logo. For example, a state 134 corresponding to the vehicle operating can disable the logo. For example, a state 134 corresponding to the vehicle being off can activate the logo. The state identifier 130 can make the determination to activate or disable the logo 146. The state identifier 130 can perform a lookup in a table or data repository with the identified state to determine whether the identified state corresponds to activation or deactivation of the logo.

If, at decision block 210, the data processing system determines to disable the logo, the data processing system can proceed to ACT 240 to disable the logo or one or more component of the data processing system to prevent input from the logo from being processed or causing the performance of a function of the vehicle. From ACT 240, the data processing system can return to ACT 205 to monitor the state of the vehicle for a change in state.

If, however, the data processing system determines to activate the logo at decision block 210, the data processing system can proceed to ACT 215 to receive input. The data processing system can receive the input from the plurality of buttons 148 contained within the logo 146. A user can input a sequence of button deployments to transmit a code, sequence, pattern, or input. The system can receive and decode this input for comparison for example via input detector 108.

Upon receiving input at ACT 215, the data processing system can proceed to decision block 220 to determine if the input matches the stored input. The data processing system can store inputs (e.g., stored inputs 114) with which to compare the received inputs. The comparison can be determined by authenticator 120. Upon a successful match, the flow chart can proceed to ACT 225.

At ACT 225, the data processing system can select a function according to the matching input. A function of a vehicle can be function 116. A function of the vehicle can correspond to the matched input. The function 116 can be stored in a data repository 112. For example, a function of the vehicle can be to unlock a compartment of the vehicle, responsive to a successful match.

Upon selecting the function, the data processing system can proceed to ACT 230 to cause or facilitate execution of the function. The function 116 can be executed, responsive to the determination of a successful match (e.g., via authenticator 120), by a controller. A controller of the data processing system can send a signal to enable the instructions for executing the function. The controller can send a signal to configure an actuator, motor, program, device, or other system of the function to operate.

If, however, the data processing system determines that the detected input does not match the stored input at decision block 220, the data processing system can proceed to decision block 235. At decision block 235, the data processing system can determine whether the number of unsuccessful matches or number of incorrect attempts in a row or within a time interval exceed a threshold number of incorrect or mismatching detecting inputs. For example, after each mismatch, the data processing system can increment a counter of unsuccessful matches. The data processing system can determine, based on the incremented counter, if the number of input attempts is less than the threshold. There can be a threshold number of user input attempts. The threshold can be threshold 118. The number of input attempts can increment with each incorrect input attempt. An incorrect input attempt can be an input by a user which does not match any of the plurality of stored inputs 114. If the number of input attempts is greater than the threshold number of input attempts, the data processing system can proceed to ACT 240. If the number of input attempts is less than the threshold number of input attempts, the flow chart can return to ACT 215.

At ACT 240 can be to disable the logo. Thus, the logo 146 can be disabled in response to the state 134, or to the number of input attempts being greater than the threshold 118. Disabling the logo can include ceasing the user ability to enter inputs from the buttons 148 of the logo 146.

Figure 3:
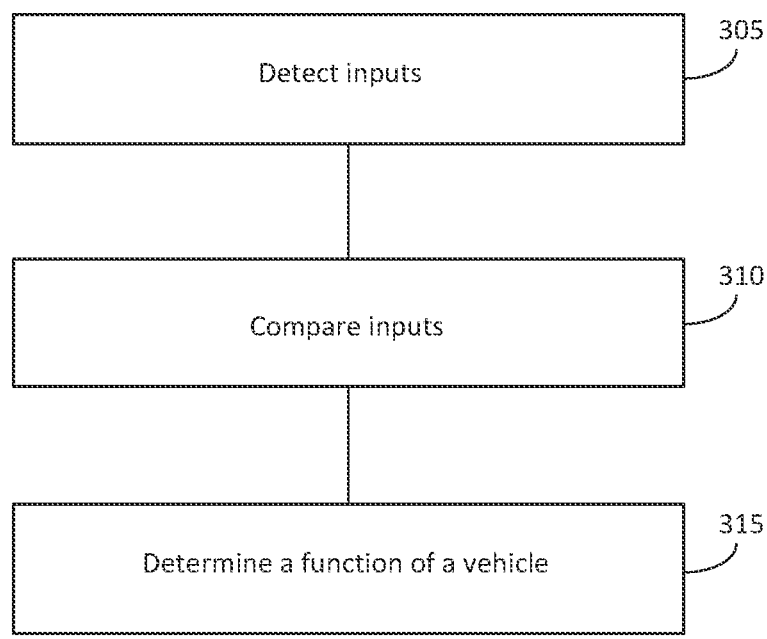
FIG. 3 depicts an example method for a vehicle logo-based controller.

FIG. 3 depicts an example method 300 for a vehicle-logo based controller. The method 300 can be performed by one or more system or component depicted in FIG. 1, FIG. 4, FIG. 5, or FIG. 6, including, for example, a data processing system and a logo. At ACT 305, the data processing system can detect inputs. The data processing system can detect inputs from buttons of a logo. The data processing system can detect inputs such as a sequence of actuation from the plurality of buttons. For example, the data processing system can detect input from a user inputting a sequence using buttons which the one or more processors will detect.

At ACT 310, the data processing system can compare inputs. The data processing system can compare the one or more detected inputs (e.g., sequence of actuation) with one or more stored inputs (e.g., pattern of actuation) based at least on the plurality of buttons. The data processing system can compare the one or more detected inputs with the one or more stored inputs to determine a match between the one or more detected inputs and the one or more stored inputs. For example, the data processing system can perform a comparison of the sequence, order, and duration of the inputs against a stored input to ascertain if the two or more sequences are equivalent in sequence, order, or duration. The data processing system can determine, based on the comparison, that the one or more inputs do not match any of the one or more stored inputs. For example, the data processing system can compare the sequence, order, and duration of the inputs against a stored input to ascertain that the two or more sequences are not equivalent in either sequence, order, or duration.

At ACT 315, the data processing system can determine a function of a vehicle. The data processing system can determine, responsive to the comparison, a function of a vehicle (e.g., function 116). For example, the matched inputs can correspond to a function of a vehicle such as unlocking a door. The data processing system can determine the function responsive to a match between the one or more inputs and the one or more stored inputs. For example, a sequence input by a user can match a stored input sequence, and that match can determine a function of the vehicle such as unlocking a compartment door. The function can include to unlock a lock for a door of the vehicle. The data processing system can select, responsive to the determination that the one or more inputs do not match any of the one or more stored inputs, the function comprising a silent function. For example, if the user inputs do not match any stored inputs, the function can be a silent function. For example, a silent function can be a function in which no action noticeable by the user is taken by the vehicle.

FIG. 4 depicts an example cross-sectional view 400 of an electric vehicle 405 installed with at least one battery pack 410. Electric vehicles 405 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 410 can also be used as an energy storage system to power a building, such as a residential home or commercial building. Electric vehicles 405 can be fully electric or partially electric (e.g., plug-in hybrid) and further, electric vehicles 405 can be fully autonomous, partially autonomous, or unmanned. Electric vehicles 405 can also be human operated or non-autonomous. Electric vehicles 405 such as electric trucks or automobiles can include on-board battery packs 410, batteries 415 or battery modules 415, or battery cells 420 to power the electric vehicles. The electric vehicle 405 can include a chassis 425 (e.g., a frame, internal frame, or support structure). The chassis 425 can support various components of the electric vehicle 405. The chassis 425 can span a front portion 430 (e.g., a hood or bonnet portion), a body portion 435, and a rear portion 440 (e.g., a trunk, payload, or boot portion) of the electric vehicle 405. The battery pack 410 can be installed or placed within the electric vehicle 405. For example, the battery pack 410 can be installed on the chassis 425 of the electric vehicle 405 within one or more of the front portion 430, the body portion 435, or the rear portion 440. The battery pack 410 can include or connect with at least one busbar, e.g., a current collector element. For example, the first busbar 445 and the second busbar 450 can include electrically conductive material to connect or otherwise electrically couple the battery 415, the battery modules 415, or the battery cells 420 with other electrical components of the electric vehicle 405 to provide electrical power to various systems or components of the electric vehicle 405.

Electric vehicle 405 can include a compartment 455. The compartment can be located on the front, side, or rear portions of the car. The compartment 455 can be accessed from outside the cabin of the vehicle. The compartment 455 can be a trunk, side compartment, or "frunk" (front trunk). The compartment 455 can be controlled by the system 100. The compartment may be locked. The compartment may be locked or unlocked manually (e.g., via a key) or remotely (e.g., via system 100). The compartment can be used to store any such items that the user desires which fit within it. The compartment 455 can be any size which is able to fit within constraints of the size of the vehicle.

The vehicle 405 can include a compartment such as a tunnel 470 that extends into the vehicle 405 on at least one side of the vehicle. The tunnel 470 can be located between a cab of the vehicle 405 and the rear portion 440, e.g., a truck bed. The tunnel 470 can include an opening on at least one side of the vehicle 405. The tunnel 470 can include an opening on a driver side of the vehicle 405 and another opening on a passenger side of the vehicle 405. The vehicle 405 can include at least one door 465.

The door 465 can rotate on an apparatus, e.g., a hinge between an open position exposing the opening of the tunnel 470 to a closed position covering the opening of the tunnel 470. The hinge can be fastened to a bottom side of the door 465 and to the vehicle 405. The hinge can rotate a top side of the door 465 downwards towards a surface under the vehicle 405. When in the open position, the door 465 may be parallel to a floor of the vehicle 405 or perpendicular to a side of the vehicle 405. The buttons on the logo 146 can be used to unlock the door 465 to allow access to the tunnel 47 or components within the tunnel 470. For example, actuating the buttons of the logo 146 can cause or allow components to extend out of the tunnel 470 over the door 465 when the door 465 is opened.

The compartment 470 can be accessible to a user from an exterior of the vehicle 405. The compartment 470 can be accessible to a user in an interior of the vehicle 405. The compartment 470 can be located between an occupant seating area (e.g., a front seating area, a rear seating area, a passenger side seating area, a driver side seating area) and the rear portion 440 of the vehicle. The compartment 470 can be included under a front hood of the vehicle 405. The compartment 470 can be included within a rear trunk of the vehicle 405. The compartment 470 can be included within a truck bed of the vehicle 405.

Electric vehicle 405 can include a logo 146. Logo 146 can include a plurality of buttons. Logo 146 can be located on the front of the vehicle, on the compartment 455, on the side of the vehicle, or on the back of the vehicle. The logo 146 can be located on a hood of the vehicle 405. The logo 146 can include a display device, light source, audio output, or other interface elements.

Electric vehicle 405 can include a logo 146 on an exterior surface of the vehicle (e.g., in sections 430, 435, or 440). Electric vehicle 405 can include one or more processors communicatively coupled with memory and the plurality of buttons of the logo. For example, electric vehicle 405 can include a data processing system as described in FIG. 1. The one or more processors can receive an indication of a sequence of actuation of the plurality of buttons of the logo. The one or more processors can match the sequence of actuation of the plurality of buttons with a stored input stored in the memory of the vehicle. The one or more processors can execute, responsive to the match, a function of the vehicle linked with the stored inputs. For example, a function of the vehicle can be unlocking the compartment 455.

Electric vehicle 405 can include the logo 146 located on the exterior surface of a compartment 455 at a front portion of the vehicle. The logo 146 can include the plurality of buttons which can include four buttons, and a first button of the plurality of buttons has a first shape and a second button of the plurality of buttons has a second shape that is different from the first shape. For example, each of the four buttons can be represented by a directional arrow.

Electric vehicle 405 can include the memory stores a plurality of patterns of actuation (e.g., stored inputs 114) linked with a plurality of functions. For example, a stored input can be linked with unlocking the compartment 455.

Electric vehicle 405 can include the one or more processors to detect a presence in a driver seat of the vehicle. For example, sensors 132 of data processing system 102 can detect the presence of a driver in the driver seat. The one or more processors can disable, responsive to the detection, execution of the function responsive to the match of the sequence of actuation of the plurality of buttons with the stored input. For example, if there is a detection of a driver in the driver seat, the vehicle 405 can disable the unlocking mechanism of compartment 455.

Electric vehicle 405 can include the one or more processors to detect a state of operation of the vehicle. The one or more processors can disable, based on the state of operation of the vehicle, execution of the function responsive to the match of the sequence of actuation of the plurality of buttons with the stored input. For example, electric vehicle 405 can detect that the vehicle is moving and can subsequently disable the unlocking mechanism of compartment 455.

Electric vehicle 405 can include the one or more processors to determine a duration of the sequence of actuation is less than or equal to a threshold. Duration can be duration 126. For example, electric vehicle 405 can determine that the time it takes the user to enter a sequence of actuation (e.g., user inputs) using the logo 146 is less than a pre-established threshold. The one or more processors can match the sequence of actuation with the stored input responsive to the duration 126 less than or equal to the threshold 118. For example, if the time for the user to input the sequence is less than the threshold amount of time, the vehicle can match the user input sequence to a stored sequence.

Electric vehicle 405 can include the one or more processors to determine that a number of sequences of actuation that do not match any stored input linked with any function stored in the memory received within a time interval is greater than or equal to a threshold. For example, a user can input multiple attempts at a sequence of actuation which do not match any of the stored sequences. The number of attempts can, for example, exceed an attempt threshold for a given time interval. The processors can disable, responsive to the determination, the logo 146 for a second time interval. For example, if the user inputs too many (e.g., over a threshold) non-matchable sequences, the processors can disable the logo 146 for a given time interval. In an embodiment, this time period can increment with subsequent failed attempts (e.g., non-matchable input sequences) within the second time interval.

Electric vehicle 405 can authorize the function including the one or more processors to open a compartment 455 of the vehicle 405. For example, responsive to detecting a user input matches a stored input, the electric vehicle 405 can authorize the unlocking of a compartment 455 of the vehicle.

Electric vehicle 405 can include the function to unlock a lock for a door of the vehicle. For example, the function 116 can be a function to unlock a passenger door (located in region 435 of the vehicle 405) or a compartment 455 door. The function 116 can unlock a lock for a door of the vehicle for example via an actuator, an electric impulse, or a software change.

Electric vehicle 405 can include the function to actuate an actuator of the vehicle. For example, electric vehicle 405 can include an actuator to manipulate the lock 150 or a door of the vehicle. The actuator can include pneumatic actuators, mechanical actuators, piezoelectric actuators, hydraulic actuators, thermal actuators, magnetic actuators, electric actuators, or any such device to allow controlled movements or positioning.

Electric vehicle 405 can include the function to establish a telecommunication channel between the vehicle and a remote device via a network. For example, the function 116 can establish a telecommunication channel (such as via Wifi, 4G, 5G, etc.) between the vehicle 405 and a remote device (e.g., computing device 138) via a network 101. The communication channel can enable bi-directional communication (e.g., the vehicle 405 can transmit and receive and the remote device can transmit and receive).

Electric vehicle 405 can include the one or more processors to receive, via a network from a computing device remote from the vehicle, a modification to the stored input linked with the function stored in the memory of the vehicle. For example, electric vehicle 405 can include one or more processors (e.g., like within data processing system 102) to receive via network 101 from computing device 138, a modification. The modification can be any change, alteration, or confirmation to at least one of the order, length, duration, sequence, combination, or time of the stored input 114 stored in data repository 112. For example, the stored input 114 can be modified from a sequence of four buttons (e.g., buttons 148) to a sequence of three buttons. For example, the stored input 114 can be modified from a sequence lasting five seconds to a sequence lasting ten seconds.

Electric vehicle 405 can include the stored input including an order of actuation of the plurality of buttons of the logo. For example, the stored input 114 can include an order (e.g., sequential arrangement or organization) of the plurality of buttons 148 of the logo 146. The logo 146 can include more or fewer buttons than those listed herein. The logo 146 can have any physical arrangement of buttons. The order of actuation of the stored input can be, for example, a user inputting a sequential arrangement of distinct or coupled inputs by pressing the plurality of buttons. Each buttons can be one input, or simultaneous presses of multiple buttons can constitute one input.

Electric vehicle 405 can include the one or more processors to provide, for display via a display device within a cabin of the vehicle, a notification of execution of the function responsive to the match. For example, a display device 144 can be located within a cabin of the vehicle 405, such as on the dashboard or center console. The one or more processors (such as via the data processing system 102) can provide a notification (e.g., a GUI, graphic, icon, or message) to the display to demonstrate execution of the function 116 responsive to a match (e.g., via authenticator 120). The display device 144 can display a notification that the match was a success or a failure. The display device 144 can display, for example, the successful unlocking of a compartment 455.

Figure 5:
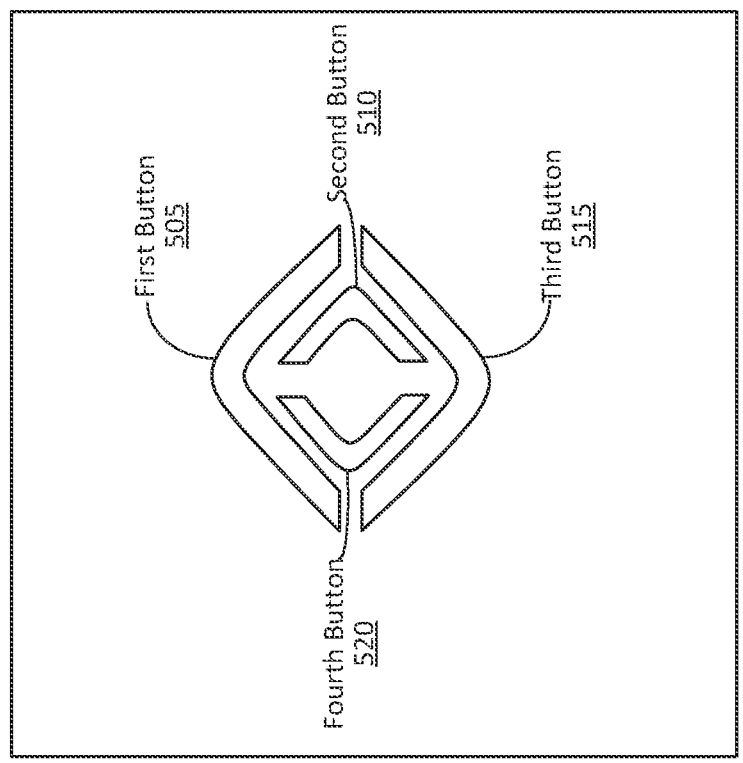
FIG. 5 depicts an example logo button configuration.

FIG. 5 depicts an example logo arrangement 500. The logo arrangement 500 can correspond to, form, or include the logo 146 depicted in FIG. 1 or FIG. 4. The logo arrangement 500 can include a first button 505, a second button 510, a third button 515, and a fourth button 520. The example logo 500 can be located anywhere on the vehicle, including the hood, trunk, a compartment of the vehicle, or a door of the vehicle. The example logo 500 can include more or fewer buttons than described herein. The example logo 500 can be flush with the face of the car, protrude, or be inset.

The first button 505, the second button 510, the third button 515, and the fourth button 520 can be of a plurality of buttons. The plurality of buttons can be capacitive, mechanical, touchscreen, toggle, or other such type of buttons to receive a user input. A user can input a sequence, pattern, or combination using the plurality of buttons.

Actuation of each button 505-520 can be detected by the data processing system. For example, the data processing system can determine which of the buttons 505-520 was actuated and in what order.

Figure 6:
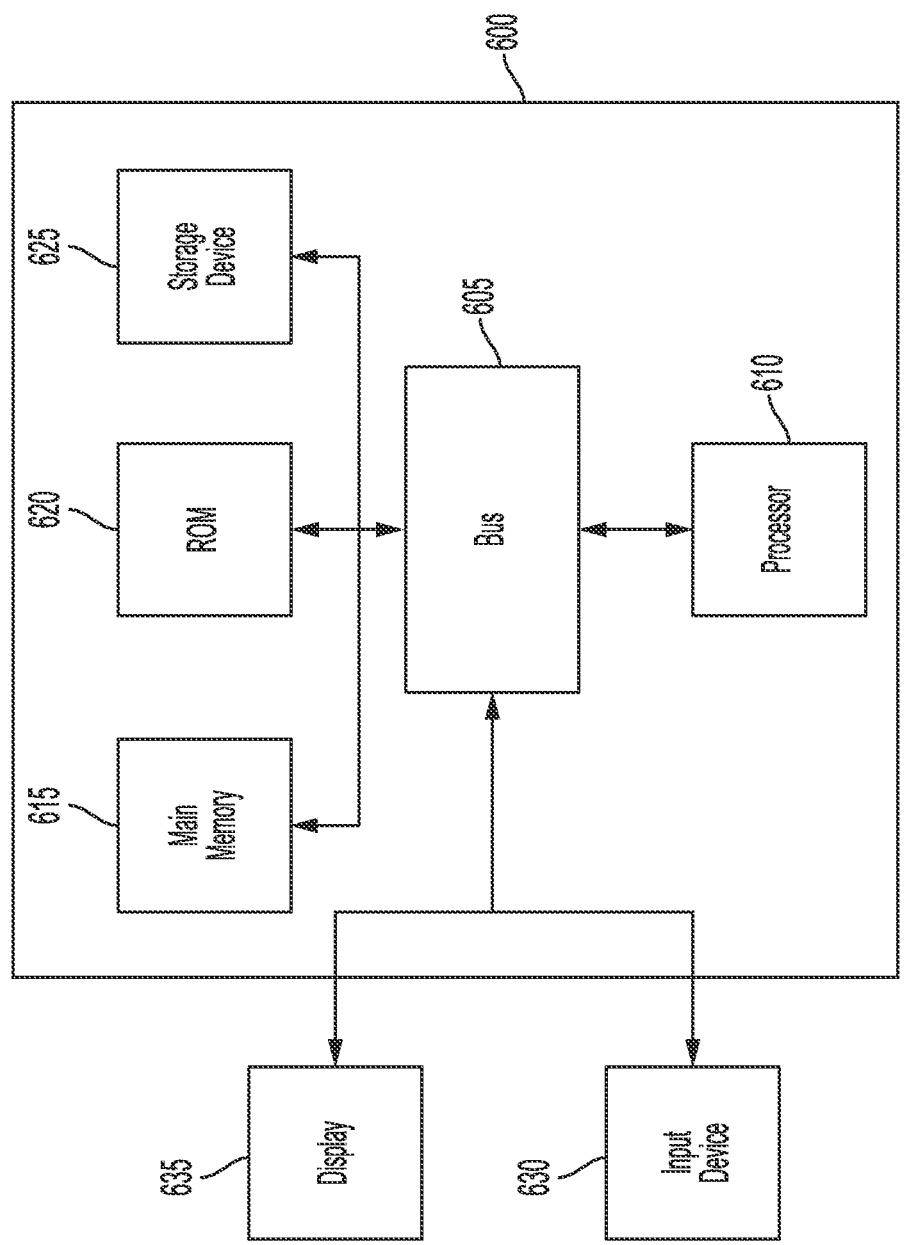
FIG. 6 is a block diagram illustrating an architecture for a computer system that can be employed to implement elements of the systems and methods described and illustrated herein.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 605 or other end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL. C. C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Relative parallel, perpendicular, vertical or other positioning or orientation descriptions can include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a logo comprising a plurality of buttons; and
one or more processors communicatively coupled with memory and the logo, the one or more processors to:
   detect one or more inputs from the plurality of buttons;
   compare the one or more detected inputs with one or more stored inputs based at least on the plurality of buttons;
   determine, responsive to the comparison, a function of a vehicle;
   detect a presence in a driver seat of the vehicle; and
   disable, responsive to the detection of the presence, execution of the function responsive to a match of a sequence of actuation of the plurality of buttons with a pattern of actuation stored in the memory.

2. The system of claim 1, comprising:
the logo comprising the plurality of buttons is located on an exterior surface of the vehicle, and wherein the plurality of buttons comprises a top button, a bottom button, a left button in between the top button and the bottom button, and a right button adjacent to the left button in between the top button and the bottom button.

3. The system of claim 1, wherein the one or more detected inputs correspond to the sequence of actuation with the plurality of buttons, and wherein the one or more processors detect the sequence of actuation with the plurality of buttons and initiate the function of the vehicle, and wherein the function comprises an actuation of a lock on the vehicle.

4. The system of claim 1, comprising:
the one or more processors to compare the one or more detected inputs with the one or more stored inputs to determine a match between the one or more detected inputs and the one or more stored inputs.

5. The system of claim 1, comprising:
the one or more processors to determine the function responsive to a match between the one or more inputs and the one or more stored inputs, wherein the function comprises activation of a light of the vehicle.

6. The system of claim 1, wherein the function comprises to unlock a lock for a front compartment of the vehicle, a back compartment of the vehicle and a gear tunnel of the vehicle.

7. The system of claim 1, comprising the one or more processors to:
determine, based on the comparison, that the one or more inputs do not match any of the one or more stored inputs; and
select, responsive to the determination that the one or more inputs do not match any of the one or more stored inputs, the function comprising a silent function.

8. The system of claim 1, comprising:
the one or more processors to receive, via a network from a computing device remote from the vehicle, a modification to the one or more stored inputs and a modification of one or more functions that map to the one or more stored inputs.

9. A method, comprising:
detecting, by one or more processors communicatively coupled with memory and a logo comprising a plurality of buttons, one or more inputs from the plurality of buttons;
comparing, by the one or more processors, the one or more detected inputs with one or more stored inputs based at least on the plurality of buttons;

determining, by the one or more processors, responsive to the comparison, a function of a vehicle; and detecting a state of operation of the vehicle; and disabling, based on the state of operation of the vehicle, execution of the function responsive to a match of a sequence of actuation of the plurality of buttons with a pattern of actuation stored in the memory.

10. The method of claim 9, comprising:

comparing, by the one or more processors, the one or more detected inputs with the one or more stored inputs to determine a match between the one or more detected inputs and the one or more stored inputs.

11. The method of claim 9, comprising:

determining, by the one or more processors, the function responsive to a match between the one or more inputs and the one or more stored inputs.

12. The method of claim 9, wherein the function comprises to unlock a lock for a door of the vehicle.

13. The method of claim 9, comprising:

determining, by the one or more processors, based on the comparison, that the one or more inputs do not match any of the one or more stored inputs; and selecting, by the one or more processors, responsive to the determination that the one or more inputs do not match any of the one or more stored inputs, the function comprising a silent function.

14. The method of claim 9, comprising:

receiving, by the one or more processors via a network from a computing device remote from the vehicle, a modification to the one or more stored inputs.

15. A vehicle, comprising:

a logo on an exterior surface of the vehicle, the logo comprising a plurality of buttons; and one or more processors communicatively coupled with memory and the plurality of buttons of the logo, the one or more processors to:

receive an indication of a sequence of actuation of the plurality of buttons of the logo;

match the sequence of actuation of the plurality of buttons with a pattern of actuation stored in the memory of the vehicle;

execute, responsive to the match, a function of the vehicle linked with the pattern of actuation;

detect a presence in a driver seat of the vehicle; and disable, responsive to the detection, execution of the function responsive to the match of the sequence of actuation of the plurality of buttons with the pattern of actuation stored in the memory of the vehicle.

16. The vehicle of claim 15, comprising:

the logo located on the exterior surface of a compartment at a front portion of the vehicle, wherein the plurality of buttons comprise four buttons, and a first button of the plurality of buttons has a first shape and a second button of the plurality of buttons has a second shape that is different from the first shape.

17. The vehicle of claim 15, wherein the memory stores a plurality of patterns of actuation linked with a plurality of functions.

18. The vehicle of claim 15, comprising the one or more processors to:

detect a state of operation of the vehicle; and disable, based on the state of operation of the vehicle, execution of the function responsive to the match of the sequence of actuation of the plurality of buttons with the pattern of actuation.

19. The vehicle of claim 15, comprising the one or more processors to:

determine a duration of the sequence of actuation is less than or equal to a threshold; and match the sequence of actuation with the pattern of actuation responsive to the duration less than or equal to the threshold.

\* \* \* \* \*